(12) United States Patent
Everett et al.

(10) Patent No.: US 7,689,826 B2
(45) Date of Patent: *Mar. 30, 2010

(54) FLEXIBLY LOADING A TAMPER RESISTANT MODULE

(75) Inventors: David Barrington Everett, East Sussex (GB); Stuart James Miller, Berks (GB); Anthony David Peacham, Kent (GB); Ian Stephen Simmons, Cambs (GB); Timothy Philip Richards, Herts (GB); John Charles Viner, Windlesham (GB)

(73) Assignee: Multos Limited, London (GB)

( * ) Notice: Subject to any disclaimer, the term of this patent is extended or adjusted under 35 U.S.C. 154(b) by 523 days.

This patent is subject to a terminal disclaimer.

(21) Appl. No.: 11/655,497

(22) Filed: Jan. 19, 2007

(65) Prior Publication Data
US 2007/0143616 A1 Jun. 21, 2007

Related U.S. Application Data

(63) Continuation of application No. 09/932,013, filed on Aug. 17, 2001, now Pat. No. 7,469,339, which is a continuation of application No. 09/076,551, filed on May 12, 1998, now Pat. No. 6,317,832, and a continuation-in-part of application No. 09/023,057, filed on Feb. 12, 1998, now Pat. No. 6,575,372.

(60) Provisional application No. 60/046,514, filed on May 15, 1997, provisional application No. 60/046,543, filed on May 15, 1997.

(30) Foreign Application Priority Data
Feb. 21, 1997 (GB) .................................. 9703591.9

(51) Int. Cl.
*G06K 19/06* (2006.01)
(52) U.S. Cl. ...................................... 713/173; 235/492
(58) Field of Classification Search .................. 713/173
See application file for complete search history.

(56) References Cited

U.S. PATENT DOCUMENTS
4,214,230 A 7/1980 Fak et al.
(Continued)

FOREIGN PATENT DOCUMENTS
EP 0 152 024 B1 8/1985
(Continued)

OTHER PUBLICATIONS

Davies et al., "Security for Computer Networks: An Introduction to Data Security in Teleprocessing and Electronic Funds Transfer," John Wiley & Sons, 1984.
Ferreira, Ronald et al., "Key Management Protocols Using Smart Card," *Smart Card 2000: The Future of IC Cards*, Proc of IFIP WG 11.6 Int. Conf, Laxenburg, Austria, pp. 167-177, Oct. 19-20, 1987.

* cited by examiner

*Primary Examiner*—Matthew B Smithers
(74) *Attorney, Agent, or Firm*—Sonnenschein Nath & Rosenthal LLP

(57) ABSTRACT

Methods and systems for flexibly loading an application, e.g., a software application, and associated data from an application provider (101) onto a tamper resistant module (TRM) (103) having an I/O buffer (115) and a memory (119). A method embodiment of the invention comprises determining (501) the size of the TRM's I/O buffer (115), segmenting (503) the application to be loaded and its associated data into a plurality of segments, with each segment adapted to be stored in the I/O buffer (115) and the size of each segment being a function of the determined size of the I/O buffer (115), separately transmitting (505) each segment to the tamper resistant module (103), and storing (603) each separately transmitted segment in a selected one of one or more available spaces of the TRM's memory (119), said spaces selected depending upon the size of each segment and upon which of said available spaces has the smallest available area in the TRM's memory (119) in which the segment can be stored.

6 Claims, 6 Drawing Sheets

U.S. PATENT DOCUMENTS

| | | |
|---|---|---|
| 4,218,582 A | 8/1980 | Hellman et al. |
| 4,259,720 A | 3/1981 | Campbell |
| 4,302,810 A | 11/1981 | Bouricius et al. |
| 4,305,059 A | 12/1981 | Benton |
| 4,321,672 A | 3/1982 | Braun et al. |
| 4,341,951 A | 7/1982 | Benton |
| 4,405,829 A | 9/1983 | Rivest et al. |
| 4,408,203 A | 10/1983 | Campbell |
| 4,423,287 A | 12/1983 | Zeidler |
| 4,442,345 A | 4/1984 | Mollier et al. |
| 4,453,074 A | 6/1984 | Weinstein |
| 4,467,139 A | 8/1984 | Mollier |
| 4,498,000 A | 2/1985 | Decavele et al. |
| 4,536,647 A | 8/1985 | Atalla et al. |
| 4,578,530 A | 3/1986 | Zeidler |
| 4,605,820 A | 8/1986 | Campbell, Jr. |
| 4,629,872 A | 12/1986 | Hällberg |
| 4,630,201 A | 12/1986 | White |
| 4,650,978 A | 3/1987 | Hudson et al. |
| 4,669,596 A | 6/1987 | Capers et al. |
| 4,705,211 A | 11/1987 | Honda et al. |
| 4,709,136 A | 11/1987 | Watanabe |
| 4,709,137 A | 11/1987 | Yoshida |
| 4,727,243 A | 2/1988 | Savar |
| 4,727,244 A | 2/1988 | Nakano et al. |
| 4,731,842 A | 3/1988 | Smith |
| 4,734,568 A | 3/1988 | Watanabe |
| 4,736,094 A | 4/1988 | Yoshida |
| 4,742,215 A | 5/1988 | Daughters et al. |
| 4,745,267 A | 5/1988 | Davis et al. |
| 4,746,788 A | 5/1988 | Kawana |
| 4,748,557 A | 5/1988 | Tamada et al. |
| 4,748,668 A | 5/1988 | Shamir et al. |
| 4,752,677 A | 6/1988 | Nakano et al. |
| 4,757,185 A | 7/1988 | Onishi |
| 4,757,543 A | 7/1988 | Tamada et al. |
| 4,759,063 A | 7/1988 | Chaum |
| 4,767,920 A | 8/1988 | Kitta et al. |
| 4,778,983 A | 10/1988 | Ushikubo |
| 4,785,166 A | 11/1988 | Kushima |
| 4,786,790 A | 11/1988 | Kruse et al. |
| 4,797,542 A | 1/1989 | Hara |
| 4,797,920 A | 1/1989 | Stein |
| 4,798,941 A | 1/1989 | Watanabe |
| 4,802,218 A | 1/1989 | Wright et al. |
| 4,803,347 A | 2/1989 | Sugahara et al. |
| 4,811,393 A | 3/1989 | Hazard |
| 4,816,653 A | 3/1989 | Anderl et al. |
| 4,816,654 A | 3/1989 | Anderl et al. |
| 4,825,052 A | 4/1989 | Chemin et al. |
| 4,831,245 A | 5/1989 | Ogasawara |
| 4,833,595 A | 5/1989 | Iijima |
| 4,839,504 A | 6/1989 | Nakano |
| 4,839,792 A | 6/1989 | Iijima |
| 4,849,614 A | 7/1989 | Watanabe et al. |
| 4,853,522 A | 8/1989 | Ogasawara |
| 4,853,961 A | 8/1989 | Pastor |
| 4,874,935 A | 10/1989 | Younger |
| 4,877,945 A | 10/1989 | Fujisaki |
| 4,877,947 A | 10/1989 | Mori |
| 4,879,747 A | 11/1989 | Leighton et al. |
| 4,882,474 A | 11/1989 | Anderl et al. |
| 4,887,234 A | 12/1989 | Iijima |
| 4,891,503 A | 1/1990 | Jewell |
| 4,891,506 A | 1/1990 | Yoshimatsu |
| 4,900,904 A | 2/1990 | Wright et al. |
| 4,901,276 A | 2/1990 | Iijima |
| 4,906,828 A | 3/1990 | Halpern |
| 4,907,270 A | 3/1990 | Hazard |
| 4,926,480 A | 5/1990 | Chaum |
| 4,935,962 A | 6/1990 | Austin |
| 4,949,257 A | 8/1990 | Orbach |
| 4,961,142 A | 10/1990 | Elliott et al. |
| 4,969,188 A | 11/1990 | Schöbi |
| 4,977,595 A | 12/1990 | Ohta et al. |
| 4,984,270 A | 1/1991 | LaBounty |
| 4,985,615 A | 1/1991 | Iijima |
| 4,987,593 A | 1/1991 | Chaum |
| 4,993,068 A | 2/1991 | Piosenka et al. |
| 4,995,081 A | 2/1991 | Leighton et al. |
| 4,996,711 A | 2/1991 | Chaum |
| 5,001,753 A | 3/1991 | Davio et al. |
| 5,003,594 A | 3/1991 | Shinagawa |
| 5,005,200 A | 4/1991 | Fischer |
| 5,010,239 A | 4/1991 | Mita |
| 5,012,074 A | 4/1991 | Masada |
| 5,012,076 A | 4/1991 | Yoshida |
| 5,014,312 A | 5/1991 | Lisimaque et al. |
| 5,016,274 A | 5/1991 | Micali et al. |
| 5,038,025 A | 8/1991 | Kodera |
| 5,068,894 A | 11/1991 | Hoppe |
| 5,093,862 A | 3/1992 | Scwartz |
| 5,097,115 A | 3/1992 | Ogasawara et al. |
| 5,120,939 A | 6/1992 | Claus et al. |
| 5,128,997 A | 7/1992 | Pailles et al. |
| 5,131,038 A | 7/1992 | Puhl et al. |
| 5,142,578 A | 8/1992 | Matyas et al. |
| 5,146,499 A | 9/1992 | Geffrotin |
| 5,148,481 A | 9/1992 | Abraham et al. |
| 5,161,231 A | 11/1992 | Iijima |
| 5,162,989 A | 11/1992 | Matsuda |
| 5,163,098 A | 11/1992 | Dahbura |
| 5,164,988 A | 11/1992 | Matyas et al. |
| 5,165,043 A | 11/1992 | Miyahara et al. |
| 5,166,503 A | 11/1992 | Mizuta |
| 5,175,416 A | 12/1992 | Mansvelt et al. |
| 5,180,901 A | 1/1993 | Hiramatsu |
| 5,191,193 A | 3/1993 | Le Roux |
| 5,191,608 A | 3/1993 | Geronimi |
| 5,200,999 A | 4/1993 | Matyas et al. |
| 5,201,000 A | 4/1993 | Matyas et al. |
| 5,202,922 A | 4/1993 | Iijima |
| 5,214,702 A | 5/1993 | Fischer |
| 5,224,162 A | 6/1993 | Okamoto et al. |
| 5,243,175 A | 9/1993 | Kato |
| 5,247,578 A | 9/1993 | Pailles et al. |
| 5,293,577 A | 3/1994 | Hueske et al. |
| 5,371,797 A | 12/1994 | Bocinsky, Jr. |
| 5,378,884 A | 1/1995 | Lundstrom et al. |
| 5,420,405 A | 5/1995 | Chasek |
| 5,452,431 A | 9/1995 | Bournas |
| 5,473,690 A | 12/1995 | Grimonprez et al. |
| 5,485,520 A | 1/1996 | Chaum et al. |
| 5,511,121 A | 4/1996 | Yacobi |
| 5,517,011 A | 5/1996 | Vandenengel |
| 5,530,232 A | 6/1996 | Taylor |
| 5,534,857 A | 7/1996 | Laing et al. |
| 5,539,825 A | 7/1996 | Akiyama et al. |
| 5,542,081 A | 7/1996 | Geronimi |
| 5,544,246 A | 8/1996 | Mandelbaum et al. |
| 5,546,523 A | 8/1996 | Gatto |
| 5,557,516 A | 9/1996 | Hogan |
| 5,574,269 A | 11/1996 | Mori et al. |
| 5,578,808 A | 11/1996 | Taylor |
| 5,581,708 A | 12/1996 | Iijima |
| 5,588,146 A | 12/1996 | Leroux |
| 5,682,027 A | 10/1997 | Bertina et al. |
| 5,692,132 A | 11/1997 | Hogan |
| 5,699,528 A | 12/1997 | Hogan |
| 5,704,046 A | 12/1997 | Hogan |
| 5,705,798 A | 1/1998 | Tarbox |
| 5,708,780 A | 1/1998 | Levergood et al. |
| 5,715,314 A | 2/1998 | Payne et al. |
| 5,724,424 A | 3/1998 | Gifford |

| | | | | | | |
|---|---|---|---|---|---|---|
| 5,796,831 A | 8/1998 | Paradinas et al. | EP | 0 636 998 B1 | 2/1995 |
| 5,825,875 A | 10/1998 | Ugon | EP | 0 647 902 B1 | 4/1995 |
| 5,841,870 A | 11/1998 | Fieres et al. | EP | 0 666 550 B1 | 8/1995 |
| 5,889,941 A | 3/1999 | Tushie et al. | EP | 0 686 947 B1 | 12/1995 |
| 6,005,942 A | 12/1999 | Chan et al. | EP | 0 707 290 B1 | 4/1996 |
| 6,038,551 A | 3/2000 | Barlow et al. | EP | 0 751 460 A2 | 1/1997 |
| 6,488,211 B1 * | 12/2002 | Everett et al. ............... 235/492 | FR | 2 536 928 A1 | 6/1984 |
| 6,742,715 B2 * | 6/2004 | Everett et al. ............... 235/492 | FR | 2 667 171 A1 | 3/1992 |
| | | | FR | 2 687 816 A1 | 8/1993 |
| | FOREIGN PATENT DOCUMENTS | | GB | 2 284 689 A | 6/1995 |
| | | | JP | 64-81084 | 3/1989 |
| EP | 0 157 303 B1 | 10/1985 | JP | 2592856 | 3/1997 |
| EP | 0 190 733 B1 | 8/1986 | WO | WO 87/07062 A1 | 11/1987 |
| EP | 0 218 176 B1 | 4/1987 | WO | WO 88/09019 A1 | 11/1988 |
| EP | 0 261 030 B1 | 3/1988 | WO | WO 90/05960 A1 | 5/1990 |
| EP | 0 275 510 B1 | 7/1988 | WO | WO 91/01538 A1 | 2/1991 |
| EP | 0 292 248 A2 | 11/1988 | WO | WO 91/16691 A1 | 10/1991 |
| EP | 0 325 506 B1 | 7/1989 | WO | WO 92/13322 A1 | 8/1992 |
| EP | 0 328 289 B1 | 8/1989 | WO | WO 93/20538 A1 | 10/1993 |
| EP | 0 354 793 B1 | 2/1990 | WO | WO 93/21612 A1 | 10/1993 |
| EP | 0 451 936 B1 | 10/1991 | WO | WO 95/22810 | 8/1995 |
| EP | 0 466 969 B1 | 1/1992 | WO | WO 96/19771 A1 | 6/1996 |
| EP | 0 475 837 B1 | 3/1992 | WO | WO 96/28795 A1 | 9/1996 |
| EP | 0 537 756 B1 | 4/1993 | WO | WO 96/38825 A1 | 12/1996 |
| EP | 0 540 095 B1 | 5/1993 | WO | WO 98/43212 A1 | 10/1998 |
| EP | 0 547 741 A1 | 6/1993 | WO | WO 99/10824 A1 | 3/1999 |
| EP | 0 559 205 B1 | 9/1993 | WO | WO 99/16031 A1 | 4/1999 |
| EP | 0 588 339 B1 | 3/1994 | WO | WO 99/16031 A3 | 4/1999 |
| EP | 0 594 493 B1 | 4/1994 | | | |

FLEXIBLY LOADING A TAMPER RESISTANT MODULE

CROSS REFERENCES TO RELATED APPLICATIONS

This patent application is a continuation of and claims priority to U.S. patent application Ser. No. 09/932,013, filed on Aug. 17, 2001 now U.S. Pat. No. 7,469,339; patent application Ser. No. 09/932,013 is a continuation of and claims priority to U.S. patent application Ser. No. 09/076,551, filed on May 12, 1998, now U.S. Pat. No. 6,317,832 entitled "Secure Multiple Application Card System and Process"; patent application Ser. No. 09/076,551 claims the priority benefit of U.S. provisional patent application No. 60/046,514 filed on May 15, 1997, entitled "Design for a Multi Application Smart Card", and further claims the priority benefit of U.S. provisional patent application No. 60/046,543 filed on May 15, 1997, and patent application Ser. No. 09/076,551 is a continuation of and claims priority to U.S. patent application Ser. No. 09/023,057 filed on Feb. 12, 1998, now U.S. Pat. No. 6,575,372, entitled "Secure Multi-Application IC Card System Having Selective Loading and Deleting Capability"; patent application Ser. No. 09/023,057 claims the priority benefit of U.S. provisional patent application No. 60/046,514 filed on May 15, 1997, entitled "Design for a Multi Application Smart Card", and further claims the priority benefit of Great Britain patent application no. 9703591.9 filed on Feb. 21, 1997 and entitled "Multiple Application Computer System". All six of these prior patent applications are hereby incorporated by reference into the present patent application in their entireties.

TECHNICAL FIELD

This invention pertains to the field of computer application distribution and, in particular, to flexibly loading software applications onto a tamper resistant module so as to effectively utilize the module's memory storage capacity.

BACKGROUND OF THE INVENTION

The invention relates to a computer system in which a population of computers has access to multiple applications. The computers may be personal computers (PC's) or, for example, integrated circuit cards ("IC cards"), also known as "smart cards". The applications may be programs available from a variety of sources, including computer tape or disc, and, in particular, remote computers with which a serial link, typically by telephone, is established.

In the PC environment, it is customary to distribute applications on floppy discs or CD ROMS and to retain them on a local hard disc for operation. In many ways, this is inconvenient, demanding high capacity local storage media and presenting difficulties with updates. In the field of smart cards, the problem of local application storage is much more acute, because storage capacity in the integrated circuit is relatively very limited. A solution in both cases is to make available applications held remotely and download them via a remote link. Internet and intranet systems are ideal vehicles for this, and it is possible to run PC's from Internet application modules (or "applets" as they are called) for immediate running and then to discard them. The applets require no local long-term storage capacity. An example of such a system is JAVA.

Several difficulties are associated with downloaded applications. One is hardware compatibility. Different computers have different microprocessors and different operating systems. It has been customary to re-write applications to cater for different computers, but this is cost-effective only for large, widely used, and static applications. It is not practicable for applets. A second problem is control of the applets. Without control, it would be possible for applets to make direct hardware calls to take control of local storage or communication devices. This could be mischievous at best and severely damaging or criminal at worst.

JAVA meets these two difficulties by ensuring that the applets are written in a common high-level interpreted language and that a local interpreter processes the applet instructions. Thus, all applets are written in the same language, and the interpreter constitutes both a hardware and a control buffer. Similarly, and for the same reasons, proposals have been made for on-board interpreters in smart cards to run downloaded high-level language applications.

IC cards are becoming increasingly used for many different purposes in the world today. An IC card typically is the size of a conventional credit card which contains a computer chip including a microprocessor, read-only-memory (ROM), electrically erasable programmable read-only-memory (EEPROM), an Input/Output (I/O) mechanism, and other circuitry to support the microprocessor in its operations. An IC card may contain a single application or may contain multiple independent applications in its memory. MULTOS™ is a multiple application operating system which runs on IC cards, among other platforms, and allows multiple applications to be executed on the card itself. This allows a card user to run many programs stored in the card (for example, credit/debit, electronic money/purse, and/or loyalty applications), irrespective of the type of terminal (i.e., ATM, telephone, and/or POS) in which the card is inserted for use.

A conventional single application IC card, such as a telephone card or an electronic cash card, is loaded with a single application at its personalization stage when it is manufactured and before it is given to a card user. That application, however, cannot be modified or changed after the card is issued, even if the modification is desired by the card user or card issuer. Moreover, if a card user wanted a variety of application functions to be performed by IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal, making the transaction difficult, lengthy, and inconvenient.

Therefore, it is beneficial to store multiple applications on the same IC card. For example, a card user may have both a purse application and a credit/debit application on the same card, so that the user could select which type of payment (by electronic cash or credit card) to use to make a purchase. Multiple applications could be provided to an IC card if sufficient memory exists and an operating system capable of supporting multiple applications is present on the card. Although multiple applications could be preselected and placed in the memory of the card during its production stage, it would also be beneficial to have the ability to load and delete applications for the card post-production as needed.

The increased flexibility and power of storing multiple applications on a single card create new challenges to be overcome concerning the application loading process, in which information (including application code and associated data) is exchanged between the application provider and the individual card. The IC card only has a finite amount of memory on the card for storing applications. Applications and their associated data can vary drastically in size, depending upon the application. When multiple applications are stored on a card, and a series of application additions and deletions have occurred, memory fragmentation becomes an issue, where memory which is free cannot be used because of size limitations.

Additionally, an IC card has limited space in its input buffer, which can be separate or combined with an output buffer, i.e., an Input/Output (I/O) buffer. It may not be possible to fit the entire application and its associated data into an I/O buffer of an IC card at one time. In order to achieve the flexibility of selectively loading and deleting applications on an IC card, the problems of limited I/O buffer space and fragmentation must be addressed.

Accordingly, it is an object of this invention to provide a system and method that allows for flexible loading of an application and its associated data onto an IC card by segmenting the application and associated data into selected segments in order to limit the size of the data packets being transmitted at one time, and to reduce fragmentation in the memory of the IC card.

According to the invention, a computer system comprises a population of computers; tamper-resistant modules each associated respectively with one of said computers; a plurality of computer applications; provider means for holding the computer applications; and means for coupling the provider means to the computers for downloading the computer applications to the computers.

The computers may be PC's, in which case the tamper-resistant modules may be smart cards read by readers attached to the computers or, for example, dongles, PC cards, or PCMCIA cards connected to the computers.

In a preferred embodiment of the invention, the computers are embodied in integrated circuits which are themselves the tamper-resistant modules. Typically, the integrated circuits are mounted in smart cards.

DISCLOSURE OF INVENTION

Methods and systems for flexibly loading an application and associated data from an application provider (101) onto a tamper resistant module (TRM) (103) having an I/O buffer (115) and a memory (119). A method embodiment of the invention comprises determining (501) the size of the TRM's I/O buffer (115), segmenting (503) the application to be loaded and its associated data into a plurality of segments, with each segment adapted to be stored in the I/O buffer (115) and the size of each segment being a function of the determined size of the I/O buffer (115), separately transmitting (505) each segment to the tamper resistant module (103), and storing (603) each separately transmitted segment in a selected one of one or more available spaces of the TRM's memory (119), said spaces selected depending upon the size of each segment and upon which of said available spaces has the smallest available area in the TRM's memory (119) in which the segment can be stored.

BRIEF DESCRIPTION OF THE DRAWINGS

Further objects, features, and advantages of the invention will become apparent from the following detailed description taken in conjunction with the accompanying Figures showing illustrative embodiments of the invention, in which.

Figure 1:
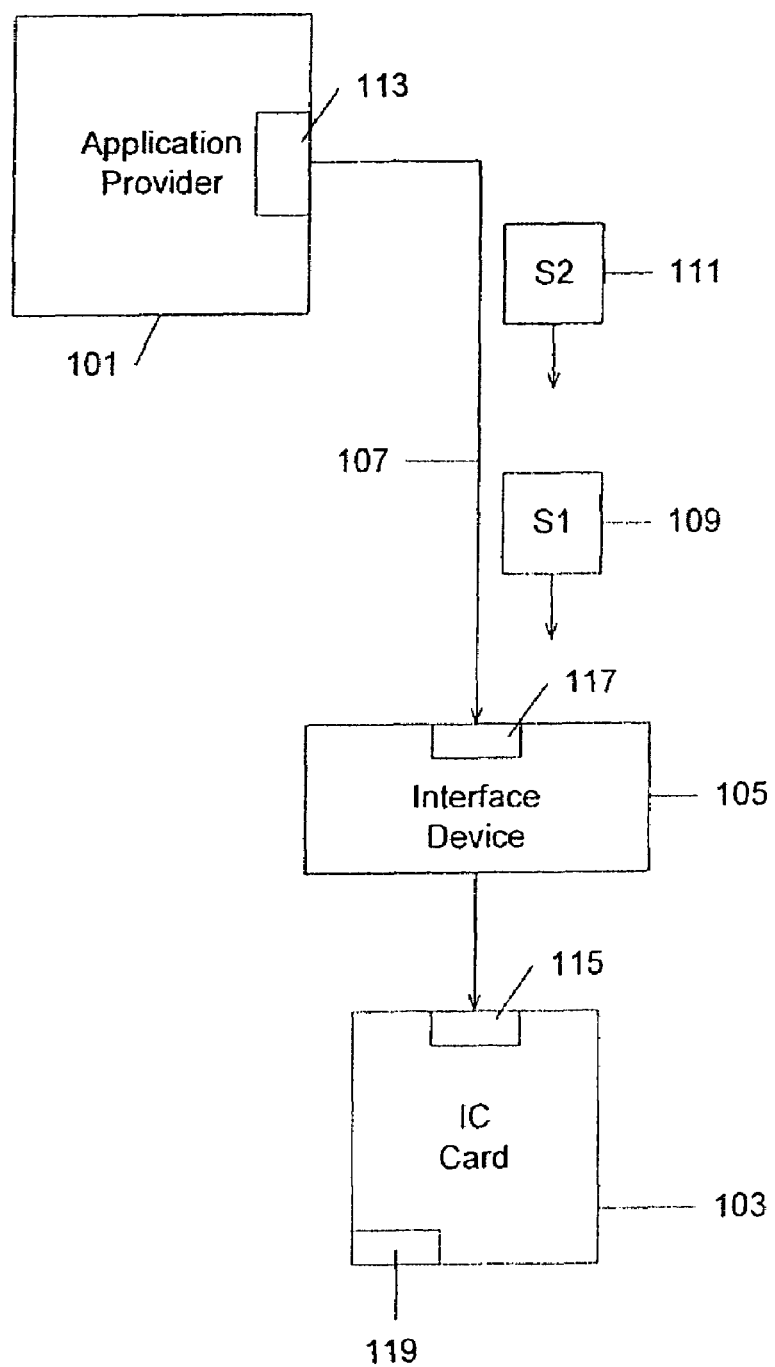
FIG. 1 is block diagram of the flexible loading system of the present invention.

Throughout the Figures, the same reference numerals and characters, unless otherwise stated, are used to denote like features, elements, components, or portions of the illustrated embodiments. Moreover, while the subject invention will now be described in detail with reference to the Figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENTS

It is beneficial to have the capability to load applications onto IC cards containing multiple application operating systems at any time during the lifetime of the IC card. This flexibility allows a user of a card to periodically add new applications to the IC card and also allows older applications to be updated with newer versions of the application when they are released. For example, a card user may start with an IC card that contains a purse, or electronic cash application (e.g., MONDEX™), being stored on the IC card. Some time after the user has the card, he or she may load an additional application, such as a credit/debit application, onto the card. Some time after loading the credit/debit application onto the card, a new version of the credit/debit application may become available, and the card user should be able to erase the old application on his or her IC card and replace it with the new version of the credit/debit application, which may contain additional features.

In a multiple application operating system environment, it is beneficial to be able to load applications and data both at terminals, such as a bank ATM machine, as well as over remote communication links, such as telephone lines, cable lines, the Internet, satellite, or other communications means. When loading applications and data onto an IC card, the application provider and the card issuer (which could be the same entity) need to provide security regarding the applications to be loaded.

The IC card has a limited amount of available I/O space and a limited amount of memory to store applications and their associated data. In order to address these limitations, the application and its associated data is segmented, such that each segment will fit in the IC card's I/O buffer at one time. The segment is then stored in the IC card's storage memory, e.g., EEPROM, in a manner that can be non-contiguous to reduce memory fragmentation. This system and technique will now be described in detail.

Having regard to the foregoing description, it will be appreciated how the invention may be applied to the PC environment, where a PC/tamper-resistant module combination is substituted at the user for the IC card.

FIG. 1 shows a block diagram of the entities used in a remote application loading process of an application and its associated data. While FIG. 1 shows a remote loading system, the flexible loading technique also applies to local loading, such as a terminal located at the application provider 101. System 100 includes an application provider 101 for transmitting an IC card application and its associated data to an intended IC card 103, an IC card interface device 105, and a data conduit 107. The application provider 101 can be a card issuer, bank, or other entity that provides application loading services. The application provider 101 preferably initiates an application loading process onto IC card 103. Alternatively, the IC card 103 can request the loading process. Application provider 101 is coupled to data conduit 107, which is coupled to interface device 105 (e.g., a terminal that communicates with an IC card 103). Data conduit 107 can be a telephone line, an intranet, the Internet, a satellite link, or any other type of communications link. The application provider 101, which is remotely located from the IC card 103 in this example, desires to send and load an application to the IC card 103. Application provider 101 has an I/O buffer 113, and IC card 103 has an I/O buffer 115. In addition, interface device 105 also contains an I/O buffer 117. Each of the I/O buffers has a maximum storage capacity. The I/O buffers could be a combined input or output buffer, or the input buffer and output buffer could be separate. However, the IC card 103 will typically have the smallest I/O buffer, due to physical size limitations. The IC card 103 also has a memory 119 in which it stores the loaded application and its associated data.

In the illustrative embodiment of FIG. 1, the application provider 101 sends two application segments S1 109 and S2 111 to the interface device 105, which is coupled to IC card 103. The application segments are discussed in more detail in connection with FIG. 4. The application and its associated data are broken into two or more segment units in order for each of the data segments to fit in the I/O buffer 115 of the IC card 103. Additionally, the segmentation of the application and associated data helps to reduce fragmentation of the memory 119 of the IC card 103 which stores the application and associated data being loaded.

FIG. 1 shows two segments, S1 109 and S2 111, that are transferred at discrete times from the application provider 101 to the IC card 103. However, any number of segments could be used, depending upon such factors as the size of the application being loaded, the size of the associated data being loaded, the size of the respective I/O buffers, the availability of memory space on the IC card 103, and the amount of memory fragmentation already on the IC card 103.

An application could be loaded directly at a terminal and not remotely. In that case, a separate interface device 105 would not be required, because the application provider 101 would have its own terminal capable of communicating with the IC card 103. For example, a bank could load an application onto an IC card 103 by requiring the customer to insert his or her card into the bank's ATM machine. In that case, the application provider 101 communicates with the IC card 103 locally and transmissions are not sent over telephone lines or the Internet. The present invention is applicable to both the remote loading and local loading.

Figure 2:
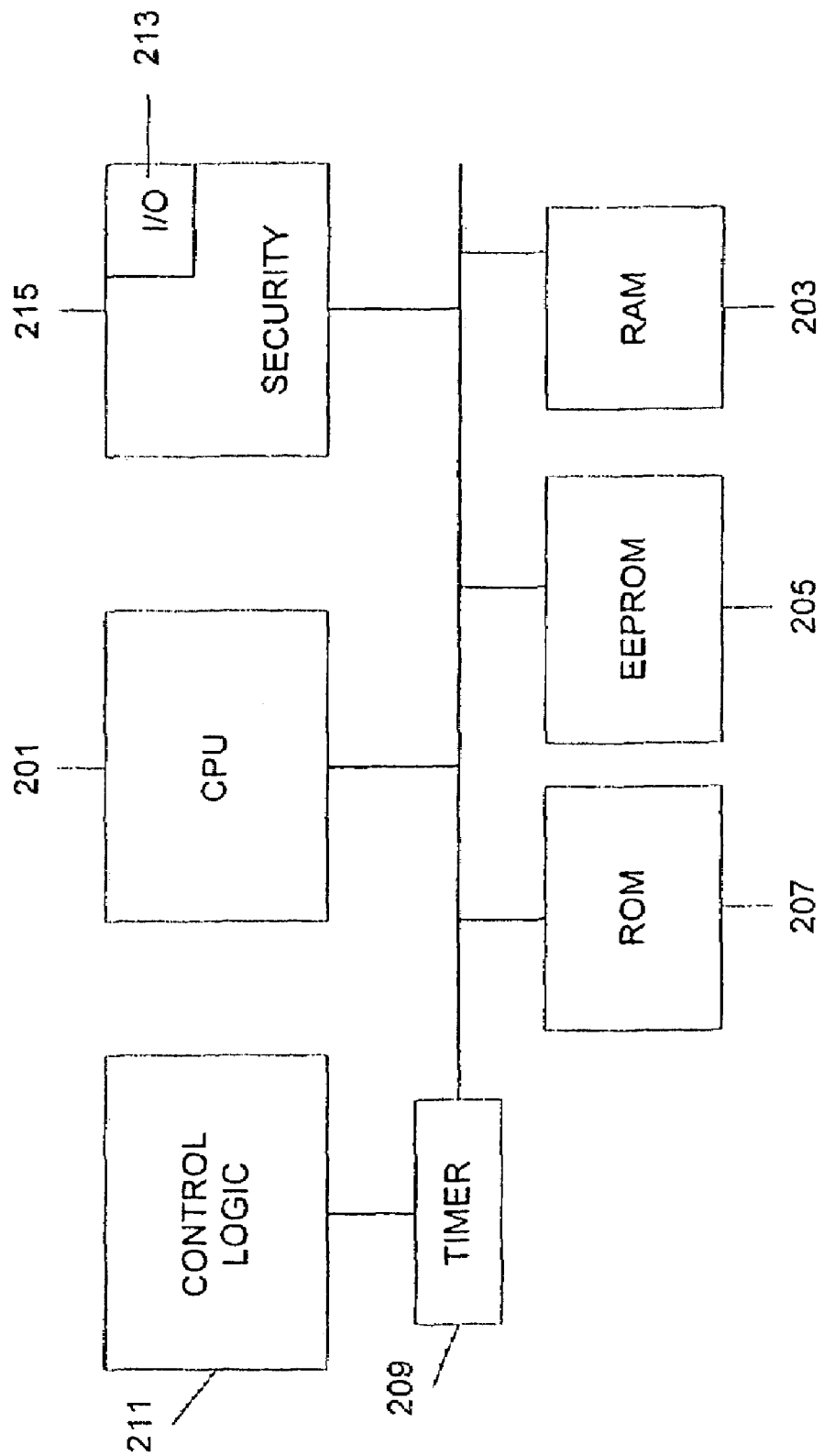
FIG. 2 is a block diagram of an IC card chip upon which an application and its associated data can be flexibly loaded and stored.

FIG. 2 shows an example of a block diagram of an integrated circuit for IC card 103, upon which an application can be flexibly loaded and stored. An integrated circuit located on an IC card 103 preferably includes a central processing unit (CPU) 201, a RAM 203, an EEPROM 205, a ROM 207, a timer 209, control logic unit 211, I/O ports 213, and security circuitry 215, which are coupled by a conventional data bus.

Control logic unit 211 provides sufficient sequencing and switching to handle read-write access to the card's memory 119 through the input/output ports 213. CPU 201 with its control logic can perform calculations, access memory locations, modify memory contents, and manage input/output ports 213. Some IC cards 103 have a core processor for handling complex computations like performing cryptographic operations. Input/output ports 213 are used under the control of CPU 201 and control logic 211, for communications between the IC card 103 and a card interface device 105 or application provider 101. Input/Output ports 213 include an I/O buffer 115. Timer 209 (which generates or provides a clock pulse) drives the control logic 211 and CPU 201 through the sequence of steps that accomplish memory access, memory reading or writing, processing, and data communication. Timer 209 may be used to provide application features such as call duration. Security circuitry 215 preferably includes fusible links that connect the input/output lines to internal circuitry as required for testing during manufacture, but which are destroyed ("blown") upon completion of testing to prevent later access. The application segments are stored in EEPROM 205. The storage and memory management process as described herein is performed by the CPU 201.

FIG. 2 also shows a possible configuration for the integrated circuit for the application provider 101. CPU 201 in the integrated circuit for the application provider 101 determines the size of the IC card I/O buffer 115, controls the segmentation of the application and associated data described herein, and performs any other necessary operation.

Figure 3:
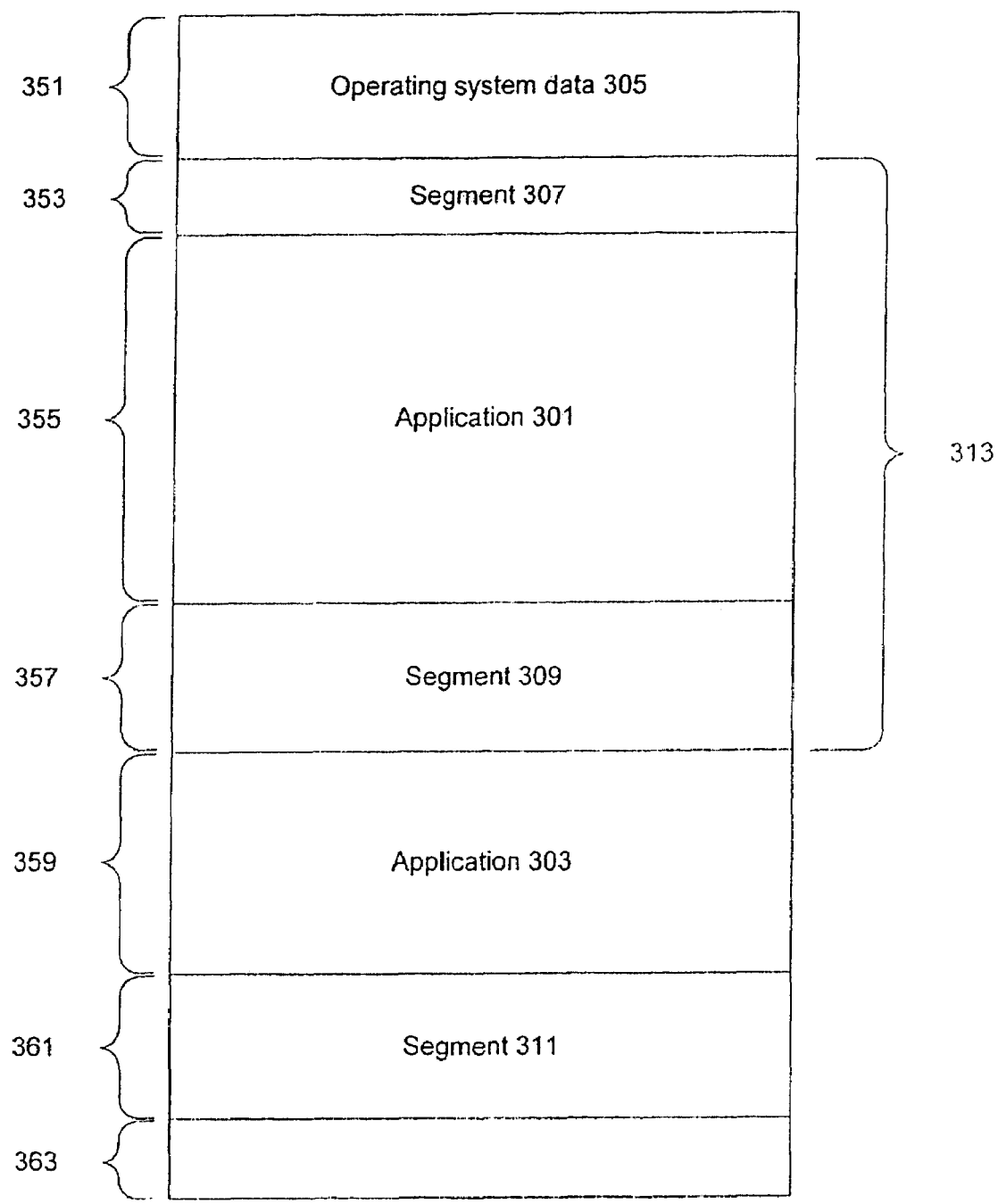
FIG. 3 is a graphic example of a memory map of EEPROM on an IC card.

FIG. 3 shows a graphic representation of a memory map of EEPROM 205 on IC card 103. In this illustrative example, three applications are stored in EEPROM 205 of IC card 103. The first application 301 is stored in a first contiguous memory space 355. Contiguous memory space means that the application occupies sequential memory addresses with no skipped memory addresses. A second application 303 is stored in a second contiguous memory space 359. Operating system data required for the execution of the operating system is stored in memory space 351. One example of a cause of fragmentation existing in the IC card 103 is a previous application being deleted which was previously located at memory space 313. The next application loaded onto the IC card 103 after the initial application was deleted can be a different size than the initial application, and thus not all the freed up available memory space can be used in such a manner where two or more programs and data are stored contiguously without leaving small portions of unused memory space. In the example of FIG. 1, the last application and its associated data which was loaded was segmented into three segments 307, 309, and 311. These segments are smaller portions of the entire application and its associated data set which could be placed in smaller areas of available memory. Thus, fragmentation in the memory of IC card 103 was alleviated by segmenting the application and its associated data.

The operating system stored on the IC card 103 maintains a record of the physical location of the different segments, and can access the physical locations when a logical address is called out when a program or operating system is being executed. The physical address look-up data can be stored in a table, a stack, a pointer, or any conventional means for indicating the physical locations. Memory space 363 in FIG. 3 is shown as not storing any data in the example, and that memory space could be later used for storing new segmented applications and their associated data.

Figure 4:
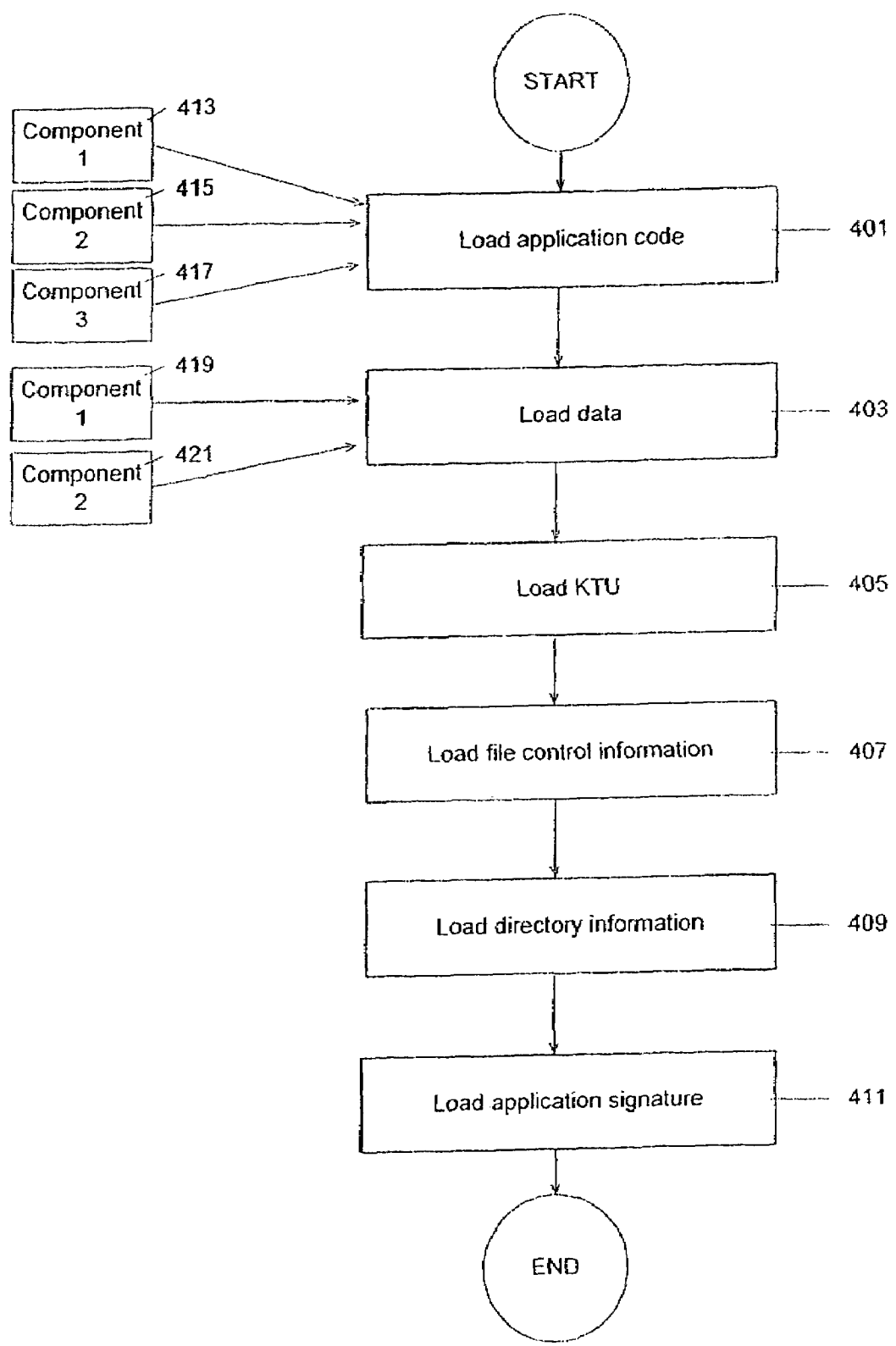
FIG. 4 is a flow chart of an example of multiple segments being loaded onto the IC card.

FIG. 4 shows a flow chart of an illustrative example of loading multiple segments into a memory 119 of an IC card 103 from an application provider 101. In this example, six initial segments are created to be loaded onto the IC card 103.

Two of the segments are further divided into components, which results in a total of nine segments individually being sent to the IC card 103.

Step 401 loads a segment corresponding to the program code of the application to be provided to the IC card 103. The program code includes the program instructions which will be executed by the microprocessor located on the IC card 103. If the code segment is too large to fit into the I/O buffer of either the IC card 103 or the application provider 101, then the segment can be further split into two or more components which can be separately transmitted to the IC card 103. In FIG. 4, three components are illustrated for the program code, components 413, 415, and 417. The components are preferably stored in contiguous memory locations in the memory 119 of the IC card 103. However, the components can be stored in non-contiguous locations if component pointers or tables are supported by the operating system on the IC card 103.

Step 403 loads the application data segment onto the IC card 103. The application data segment includes necessary and optional data needed for the execution of the application code. For example, if the application is a credit/debit application, the card user's account number, identification data, and credit limit may be needed for the application to ran. Another example is a health related application where a customer's medical history may be stored on the IC card 103 for quick access at remote locations. The medical history data may be quite large and require further segmentation into two or more components. In FIG. 4, components 419 and 421 are shown as subsets of the data segment being loaded in step 403.

Step 405 loads a Key Transformation Unit (KTU) segment for the application being loaded. If the application is being loaded from a remote location, there is a need to make sure the transmission is secure from third party access. The KTU information preferably contains information regarding the encryption key used to encipher the application program and associated data. The key information is sent with the application because applications can be transmitted from any application provider 101 to any IC card 103 within an IC card system 100. Since different encryption techniques can be used by different application providers 101, the KTU information is necessary. However, the flexible loading technique also applies when no encryption scheme is used, and this information could also be included in another segment depending upon its size.

Step 407 loads a file control segment onto the IC card 103. File control information preferably includes an application identifier, security information, and application and data size requirements. The file control information will be used by the operating system on the IC card 103 to process the application. While in this example the file control information is a separate segment, it could be included in another segment depending upon its size.

Step 409 loads a directory information segment onto the IC card 103. The directory information preferably includes the name of the application which can be used by the operating system to identify the application. For example, if a select file command is initiated by a terminal, the name of the file to be selected which accompanies the command will be recognized by the operating system on the IC card 103. If the MONDEX™ Purse is selected by a customer as a terminal, the terminal will send a command to the IC card 103 in the form of a "Select File Mondex," and the IC card 103 will correlate MONDEX with a previously loaded application with the directory name Mondex. While in this example the directory information is a separate segment, the information could be included in another segment, depending upon its size.

Step 411 loads an application signature segment onto the IC card 103. The application signature segment preferably includes data signed with the digital signature of the application provider 101. This allows the IC card 103 to verify that an apparent application provider is the genuine application provider 101 and not an imposter. The IC card 103 verifies the signature with the public key of an asymmetric encryption key pair of the application provider 101. While in this example the application signature is a separate segment, the information could be included in another segment if its size permitted it.

The segments could be organized in any manner and sent in any order. The IC card 103 will need to have identified the subject matter of the incoming segment or component so that it can later locate a specific segment or component when needed. This information can be part of the load control information, or can be obtained prior to the loading of the application. While FIG. 4 describes a number of different segments, the subject matter of the segments transmitted will vary and depend upon the particular application and associated data.

Figure 5:
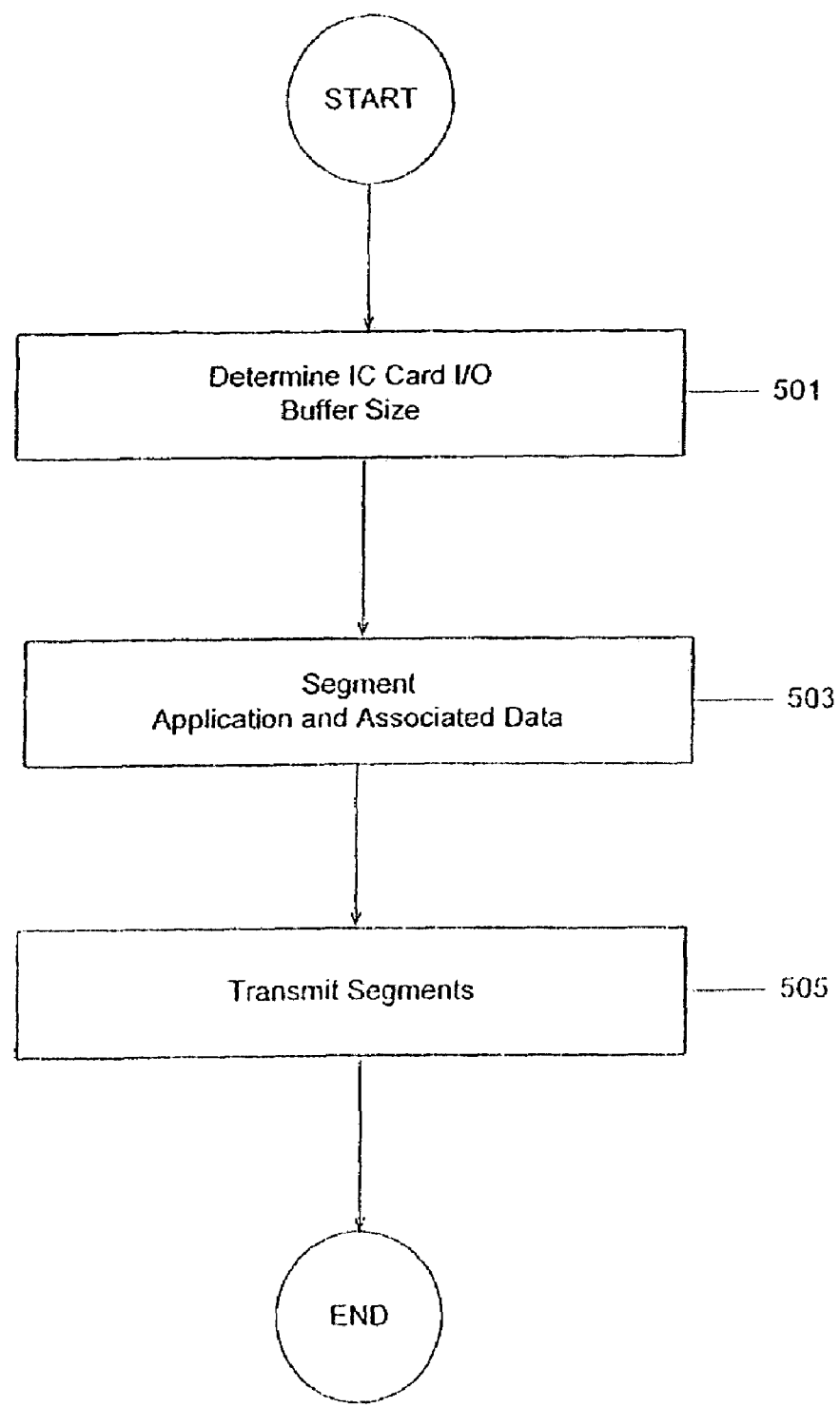
FIG. 5 is a flow chart of the steps of segmenting the application and its associated data by the application provider.

FIG. 5 shows a flowchart of the steps the application provider 101 performs when segmenting the application and associated data to be loaded upon the IC card 103. Step 501 determines the I/O buffer size of the IC card 103. Alternatively, the input buffer size is determined if the input and output buffers are separate on the IC card 103. In most cases, the IC card I/O buffer 115 will be smaller than the application provider I/O buffer 113, because of the limited memory capacity on the IC card 103. However, if the application provider I/O buffer 113 or the interface device I/O buffer 117 is smaller than the IC card I/O buffer 115, the smallest I/O buffer will control the size of the segments. The application provider 101 can determine the IC card memory buffer size by some preliminary information exchange which identifies the IC card 103 as the correct card upon which to load the application. Alternatively, some agreement or standard can be followed so that the application provider 101 can create segments which will fit in an IC card 103 which follows the agreement or standard.

Step 503 then segments the application and associated data into two or more segments. In the example of FIG. 4, six initial segments were created, and some of the segments were further divided to form two or more components. The segmented information is preferably divided in a predetermined organization to aid the IC card 103 processing of the segments.

Step 505 then sends the segments to the IC card 103 one at a time. When the IC card 103 receives a segment in its I/O buffer 115, it will store that segment in a location of its memory 119, thus freeing up its I/O buffer 115 for the next incoming segment. After all the segments have been transmitted, the application provider 101 can send a transmission indicating no more segments are being transmitted, or the number of segments can be sent at the beginning of the transmission. Alternatively, a known segment protocol can be followed.

Figure 6:
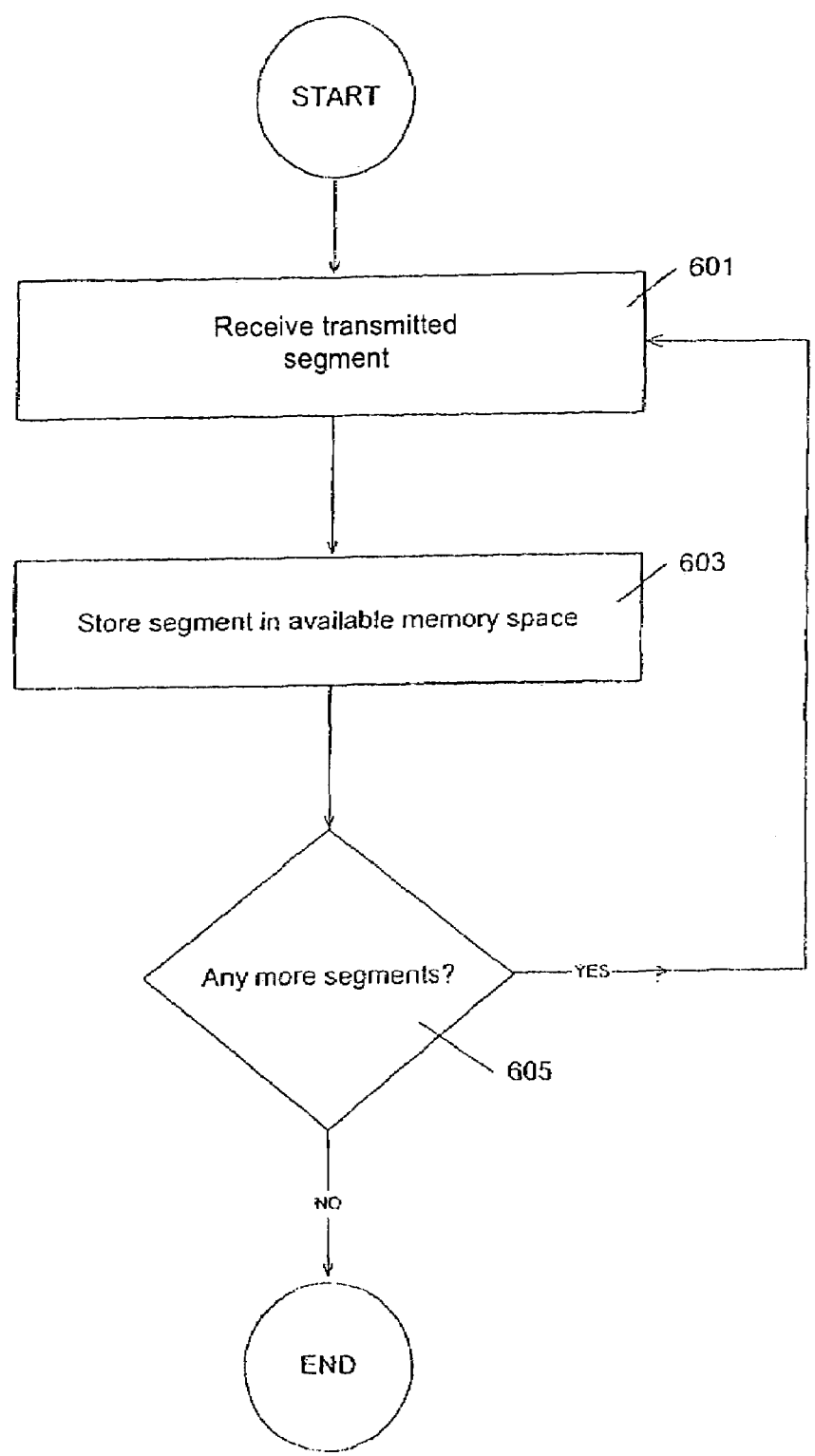
FIG. 6 is a flow chart of the steps of receiving and processing the segmented information by the IC card.

FIG. 6 is a flow chart of the steps of processing the segmented information performed by the IC card 103. Step 601 receives a transmitted segment in the I/O buffer 115 of the IC card 103. The entire segment will fit within the I/O buffer 115 because of the processing performed at the application provider. Step 603 then stores the segment in available memory space after the microprocessor on the IC card 103 identifies the proper memory space. The processor can check for the first available free memory space that is sufficient to store the segment. Once the segment is stored at a physical location, that location is recorded either in a segment address table, by a pointer, or by any other conventional means. Different memory architectures can be used for storing the segments. For example, all the similar types of segments (e.g., program code) for the stored applications can be stored contiguously if desired. Alternatively, the processor can determine the space that is closest in size to the segment to be stored by scanning the memory 119. This will reduce any problems of fragmentation in the limited size memory 119 of IC card 103.

Step 605 determines if there are any additional segments to be stored. This step can be accomplished by checking earlier information regarding the number of segments which were being sent. It can also be accomplished by receiving a transmission indicating no more segments. Alternatively, the IC card 103 can simply remain in a wait status until additional data or instructions are sent to the IC card 103. If the IC card 103 determines that additional segments are being transmitted, the technique jumps back to steps 601. If no more segments, the process ends.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, while loading an application and its associated data is discussed herein, the same flexible loading process can apply to transmitting other types of data such as data blocks, database files, word processing documents, or any other type of data required to be transmitted in a segmented manner.

Furthermore, although the foregoing description of the preferred embodiments revolves around a discussion of IC cards 103 (or "smart cards"), the presently claimed methods and apparati are applicable to all tamper resistant modules generally, and not just to such cards. Thus, the term "tamper resistant module" can be used in lieu of the term "IC card" or "smart card" throughout this written description. The term "tamper resistant module" includes, but is not limited to, one or more IC cards, smart cards, dongles, PC cards, and/or PCMCIA cards. The IC cards, smart cards, dongles, PC cards, and/or PCMCIA cards may be coupled to one or more computers.

We claim:

1. A method for loading an application and its associated data from an application provider onto a tamper resistant module (TRM), wherein said TRM comprises an input buffer and a memory containing at least one available space, and each available space is defined by contiguous sequential memory addresses with no skipped addresses, said method comprising the steps of:
   determining said TRM's input buffer size;
   dividing said application to be loaded and its associated data into a plurality of segments, each segment adapted to be stored in said TRM's input buffer, wherein the size of each segment is a function of the determined input buffer size;
   separately transmitting each said segment to said TRM;
   storing each said separately transmitted segment in one of said available spaces of said TRM's memory depending on the size of each segment; and
   determining an available area in said TRM's memory to store each said segment, wherein said step of determining an available area comprises determining which of said available spaces has the smallest available area in said TRM's memory in which said segment can be stored.

2. Apparatus for loading an application and its associated data onto a tamper resistant module (TRM), said apparatus comprising:
   an application provider comprising means for determining said TRM's input buffer size, means for dividing said application and its associated data into a plurality of segments, each segment adapted to be stored in said TRM's input buffer, wherein the size of each segment is a function of the determined input buffer size, and means for separately transmitting each said segment to said TRM; and
   a TRM comprising a memory containing at least one available space, wherein each said available space is defined by contiguous sequential memory addresses with no skipped addresses, means for receiving said transmitted segments, means for storing each said transmitted segment in one of said available spaces of said TRM's memory depending on the size of each segment, and means for determining an available area in said memory to store each said segment; wherein
   said means for determining an available area determines which of said available spaces has the smallest available area in which said segment can be stored.

3. A method for loading an application and its associated data from an application provider onto a tamper resistant module (TRM), wherein said TRM comprises a memory containing at least one available space and each available space is defined by contiguous sequential memory addresses with no skipped addresses, said method comprising the steps of:
   determining said TRM's input buffer size;
   dividing said application to be loaded and its associated data into a plurality of segments, each segment adapted to be stored in said TRM's input buffer, wherein the size of each segment is a function of the determined input buffer size;
   separately transmitting each said segment to said TRM; and
   storing each said separately transmitted segment in one of said available spaces of said TRM's memory depending on the size of each segment, wherein at least two of said segments are not stored in contiguous available spaces, and said at least two segments that are not stored in contiguous spaces are contiguous with at least a portion of another application previously stored on said TRM.

4. Apparatus for loading an application and its associated data onto a tamper resistant module (TRM), said apparatus comprising:
   an application provider comprising means for determining said TRM's input buffer size, means for dividing said application and its associated data into a plurality of segments, each segment adapted to be stored in said TRM's input buffer, wherein the size of each segment is a function of the determined input buffer size, and means for separately transmitting each said segment to said TRM; and
   a TRM comprising a memory containing at least one available space wherein each available space is defined by contiguous sequential memory addresses with no skipped addresses, means for receiving said transmitted segments, and means for storing each said transmitted segment in one of said available spaces of said TRM's memory depending on the size of each segment, wherein at least two segments are not stored in contiguous available spaces in said TRM, and said at least two segments that are not stored in contiguous spaces are contiguous with at least a portion of another application previously stored on said TRM.

5. A method for loading an application onto a tamper resistant module (TRM), the TRM comprising a memory containing at least two available different-sized spaces each defined by a contiguous memory space of sequential memory addresses with no skipped addresses, said different-sized spaces resulting from content deletions or additions to said memory and including at least one said space having a smallest-sized available area, said method comprising:

dividing the application into a plurality of segments; and for at least one segment, determining which of the available spaces has the smallest-sized available area in the memory into which the at least one segment can be stored.

6. Application loading apparatus for loading an application onto a tamper resistant module (TRM), said apparatus comprising:

an application provider for dividing the application into a plurality of segments; and a TRM comprising a memory containing at least two available spaces each defined by a contiguous memory space of sequential memory addresses with no skipped addresses, said different-sized spaces resulting from content deletions or additions to said memory and including at least one said space having a smallest-sized available area, the TRM determining, for at least one of the segments, which of the available spaces has the smallest available area in the memory into which the at least one segment can be stored.

* * * * *